United States Patent [19]

Torii et al.

[11] Patent Number: 5,105,136
[45] Date of Patent: Apr. 14, 1992

[54] STRUCTURE OF SHAFT SUPPORTER IN INDUSTRIAL ROBOT

[75] Inventors: Nobutoshi Torii, Hachioji; Susumu Ito, Yamanashi; Masayuki Hamura, Yamanashi; Akira Tanaka, Yamanashi, all of Japan

[73] Assignee: Fanuc Ltd., Yamanashi, Japan

[21] Appl. No.: 465,115

[22] PCT Filed: Jun. 22, 1989

[86] PCT No.: PCT/JP89/00619
  § 371 Date: Feb. 20, 1990
  § 102(e) Date: Feb. 20, 1990

[87] PCT Pub. No.: WO89/12531
  PCT Pub. Date: Dec. 28, 1989

[30] Foreign Application Priority Data

Jun. 23, 1988 [JP] Japan .................. 63-153392

[51] Int. Cl.⁵ .................. G05B 11/01; B25J 18/00
[52] U.S. Cl. .................. 318/568.11; 318/628; 318/568.1; 901/25; 901/21; 74/96; 74/216.3
[58] Field of Search .................. 318/568.11, 568.13, 318/568.2; 901/25, 15, 26, 21, 23; 414/744 R; 74/96, 216.3, 469, 479

[56] References Cited

U.S. PATENT DOCUMENTS

| 3,481,499 | 12/1969 | Pierson et al. | 901/25 |
| 4,289,441 | 9/1981 | Inaba et al. | 901/25 |
| 4,690,010 | 9/1987 | Matsumoto et al. | 901/25 |
| 4,738,576 | 4/1988 | Eberle et al. | 901/25 |

FOREIGN PATENT DOCUMENTS 58-2125236 12/1983 Japan .
59-176784 11/1984 Japan .
60-259390 12/1985 Japan .

*Primary Examiner*—Paul Ip
*Attorney, Agent, or Firm*—Armstrong, Nikaido, Marmelstein, Kubovcik & Murray

[57] ABSTRACT

A gear box (30) housing a reduction gear unit (24) and supporting a drive motor (22), and a elongated screw shaft (12) is fitted over a base plate (14) so that an area of a shaft supporter (10) projected in a plane perpendicular to a longitudinal direction of the elongated screw shaft is reduced, which supporter supports both ends of the elongaged screw shaft (12) for moving a movable element such as an arm of an industrial robot in a predetermined direction. Furthermore, a circular boss portion (32b) provided at the lower face of the gear box (30) and a hole (14a) provided at the base plate (14) are used for positioning the gear box on the base plate (14), and the positioning in a height direction is achieved by positioning elements (40) having a predetermined height dimension when the gear box (30) is attached to the base plate (14).

5 Claims, 4 Drawing Sheets

STRUCTURE OF SHAFT SUPPORTER IN INDUSTRIAL ROBOT

TECHNICAL FIELD

The present invention relates to a structure of a shaft supporter utilizing a gear box for reducing the drive rotations of a drive motor, and supporting an end portion of an elongated screw shaft, such as a ball screw shaft, for a vertical operation of a part of an industrial robot, the ball screw shaft being rotated by the drive motor.

BACKGROUND ART

An industrial robot is used as a manipulator for carrying out a handling operation such as gripping, transferring, or positioning a work piece by an end effector such as a robot hand equipped at an end of a robot arm, in accordance with a programmed command or a teaching command. A movable element such as the robot arm is sometimes positioned at a constant level with regard to the attachment thereof to the robot, and the movable element itself is driven by the drive motor. On the other hand, a robot having the following operational function is in use, in which a vertically movable element itself is moved vertically by an operational mechanism for a vertical motion having a vertically extended ball screw shaft, so that a tip end of the movable element is moved vertically toward or away from a work piece.

FIG. 5 is a perspective and schematic view of a supporter for supporting a vertically extended shaft such as the above-mentioned ball screw shaft, but does not show the vertically extended shaft. The supporter comprises a base 1 for the vertically extended shaft, two shafts 2 and a supporting member 3 projecting upward from a plate 1a of the base 1, and an upper plate 4 mounted on the tops of the shafts 2 and the supporting member 3. Furthermore, the base 1 comprises a gear box 5 at one end thereof. A lower end of a ball screw shaft, not shown, is rotatably journaled at a substantially central position of the plate 1a of the base 1, and an upper end thereof is journaled by a bearing on the upper plate 4. In general, the gear box 5 is molded as one body with the base 1 to reduce the number of steps required for assembling such a supporter for supporting a vertically extended shaft, and the above-mentioned shafts 2 and supporting member 3 are welded to the base 1 to form a one-body type supporter.

A drive motor (not shown) for driving the above-mentioned ball screwshaft is attached to the gear box protruding from the above-mentioned one body type supporter to facilitate the maintenance thereof after attachment, and rotates the ball screw shaft via a reduction mechanism, i.e., gears housed in the gear box 5, and not shown belts and pulleys provided in the above-mentioned base 1.

The above-mentioned supporter, however, is not compact because the gear box 5 thereof protrudes outward, and in particular, it is difficult to adapt same to a robot having an elongated body along the axis of a ball screw shaft.

DISCLOSURE OF THE INVENTION

Accordingly, an object of the invention is to provide a compact shaft supporter structure without a protrusion.

In view of the above object, the present invention provides a structure of a shaft supporter for supporting both ends of an elongated screw shaft driven by a drive motor in an industrial robot, characterized by comprising an acceptable plate as a base plate, a detachable gear box fitted over the acceptable plate, journaling one end of the elongated screw shaft, attaching the drive motor thereon in parallel with the elongated screw shaft, and housing gears for transmitting the rotation of the drive motor to the elongated screw shaft, an elongated supporting member installed on the acceptable plate in parallel with the prolonged screw shaft, and a holder plate for journaling the other end of the elongated screw shaft and attached to an end of the supporting member.

The elongated screw shaft is journaled by a gear box positioned over an acceptable plate, and furthermore, a drive motor is attached in parallel with the elongated screw shaft so that a compact shaft supporter structure can be obtained to reduce a projecting area thereof on a plane perpendicular to a longitudinal direction of the elongated screw shaft. Further, the maintenance of the drive motor is simplified because the gear box is detachably fitted to the drive motor.

BEST MODE OF CARRYING OUT THE INVENTION

The present invention is described in more detail in the following, in accordance with the embodiments shown in the attached drawings.

Figure 1:
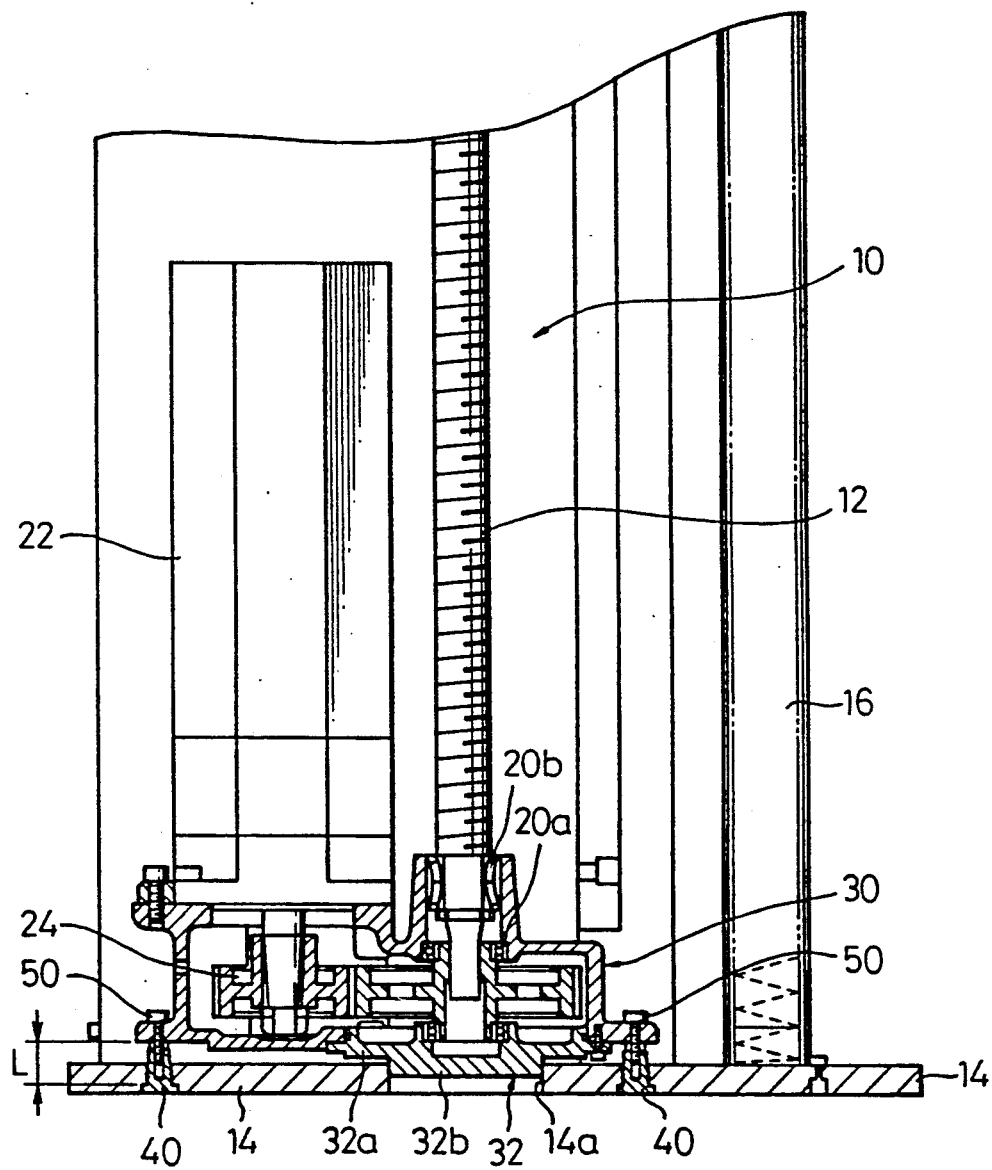
FIG. 1 is a longitudinal sectional view showing the main part of a shaft supporter in an industrial robot according to the present invention.

Referring to FIG. 1, a structure of a shaft supporter is fitted to the industrial robot as a supporter for supporting a vertically extended elongated ball screw shaft for vertically transporting an arm, etc. of the robot, the shaft supporter 10 being formed to rotatably support both ends of the ball screw shaft 12 at a substantial central position thereof. The shaft supporter 10 comprises an acceptable plate 14 as a base plate member consisting of one metal plate at the bottom thereof, and columnar support frames 16 installed on an upper surface of the acceptable plate 14 as a rigid body. An upper plate 18 shown in FIG. 2 is attached to the tops of the support frames 16, opposite to the acceptable plate 14, to support an upper end of the ball screw shaft 12, although not shown in FIG. 1.

Figure 5:
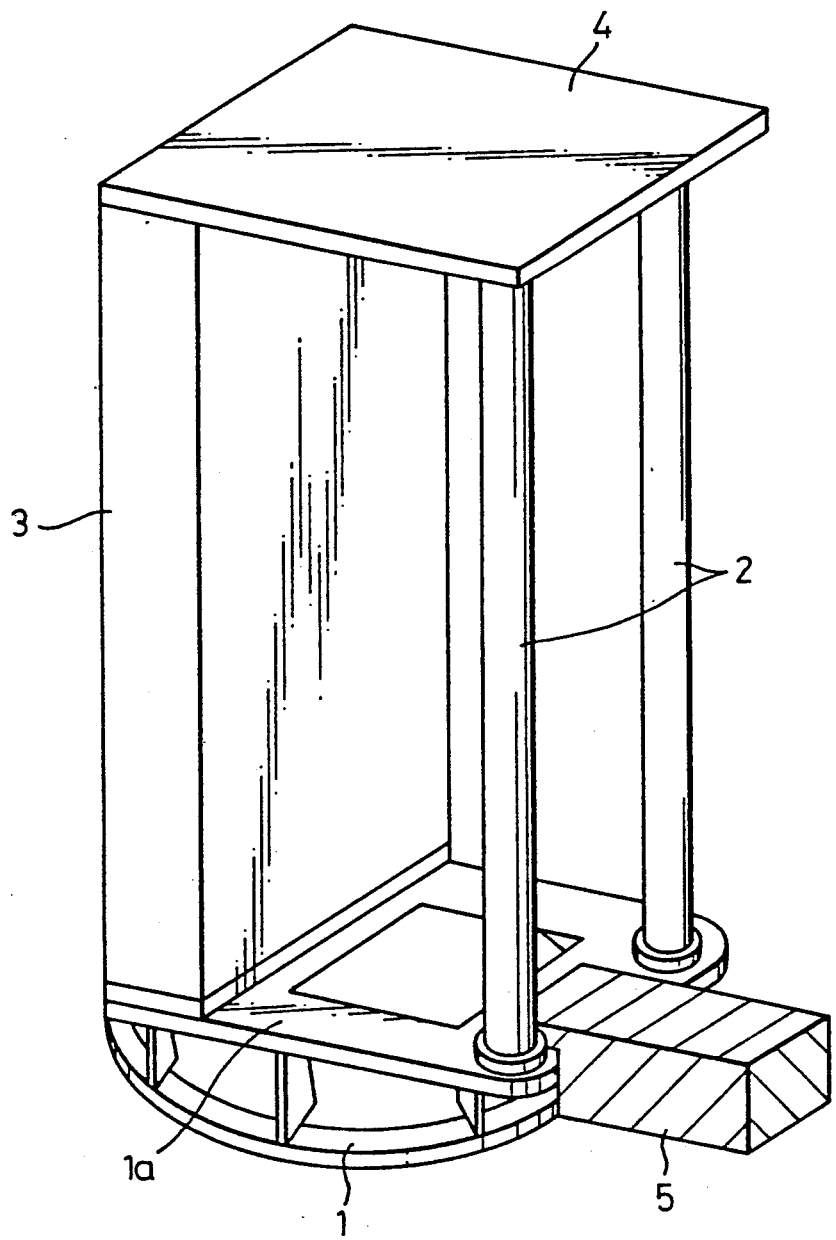
FIG. 5 is a perspective view showing a supporter for the vertically extended shaft of the prior art.

A gear box 30 is attached to a predetermined position at the bottom acceptable plate 14, and houses bearings 20a and 20b for supporting a lower end of the above-mentioned ball screw shaft 12 and is formed as a casing for housing a reduction gear unit 24 for transmitting reduced rotation of a drive motor 22 to the ball screw shaft 12. The gear box 30 is formed separately by molded parts, and is tightly connected to the acceptable plate 14 at a predetermined insertion position of the plate, to be tightly fixed and positioned in a vertical position by bolts 50 and positioning elements 40 provided at a plurality of positions, as mentioned later. Thus, the acceptable plate 14 can be formed by cutting a plate member, because the gear box 30 is formed separately, and furthermore, the acceptable plate 14 can be made compact because the plate and the gear box 30 are connected one upon the other, different from the one body molding structure of a gear box 5 and a base 1 of the prior art, as mentioned before with reference to FIG. 5. The gear box 30 requires a cover member for closing the same after the reduction gear unit 24 is housed in a hole of the gear box 30, and thus a housing 32 as a cover member is fixed to the bottom of the gear box by bolts. The housing 32 has a plate portion 32a and a columnar or cylindrical boss portion 32b projecting perpendicularly from a face of the plate portion 32a. The latter cylindrical boss portion 32b is utilized as a insert portion to be connected tightly to a insert hole 14a of the acceptable plate 14 so that the whole gear box 30 can be easily assembled to the acceptable plate 14 at a predetermined position on the plate. On the other hand, the drive motor 22 is attached to the gear box 30 in parallel with the ball screw shaft 12, i.e., screwed coaxially, so that an output shaft thereof is connected to an input gear of the reduction gear unit 24, to enable an easy assembly, so that rotations of an output gear of the reduction gear unit 24 are transmitted to the ball screw shaft 12 at a predetermined reduction ratio.

Figure 2:
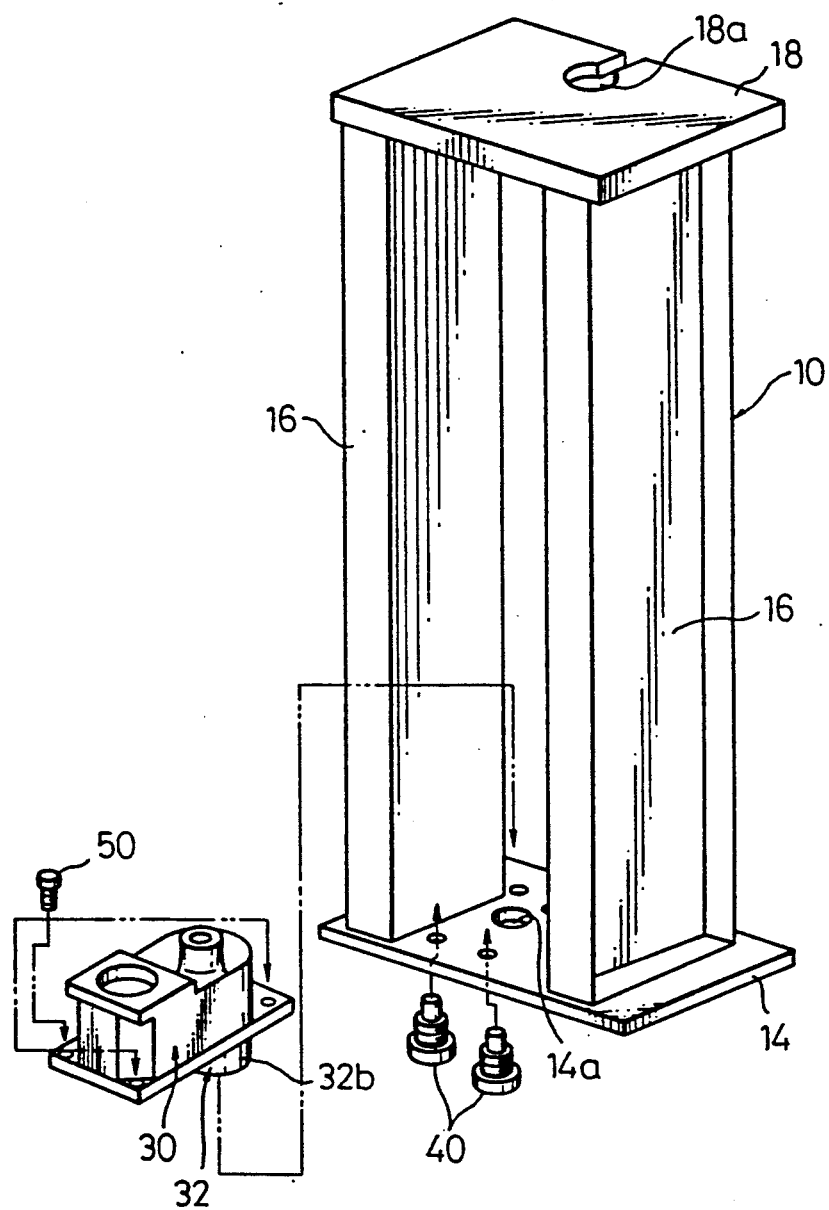
FIG. 2 is a perspective view showing a gear box, a positioning element, and a support frame assembled with an acceptable plate in the shaft supporter when separated.

Referring to FIG. 2, a gear box 30 is shown when not assembled to the acceptable plate 14, and an upper plate 18 is attached to the tops of two support frames 16 installed on the acceptable plate 14.

The support frames 16 are fixed to the acceptable plate 14 by a usual method such as welding, bolts or screws; usually, welding is preferred in view of the connection strength. The upper plate 18 is also connected to the support frames 16 by a similar method utilizing welding, bolts, and screws, etc. After the upper plate 18 is connected, the support frames 16, and the acceptable plate 14 are joined together, and a bearing hole 18a of the upper plate 18 and the insert hole 14a of the acceptable plate 14 are machined coaxially. FIG. 2 shows the acceptable plate 14 and the upper plate 18 machined in such a manner and connected to the upper and lower ends of the support. The housing of the gear box 30 has a cylindrical boss portion 32b which is inserted through the insert hole 14a of the plate 14 by placing the gear box 30 on the plate 14. This is accomplished by passing the gear box from a space located between the support frames 16 in order to allow the cylindrical boss portion 32b to be inserted into the insert hole 14a. When this is accomplished, the assembled structure is encompassed by the plate 14, the support frames 16, and the upper plate 18. At this stage, the above-mentioned positioning elements 40 and bolts 50 are used so that the gear box 30 is attached to the acceptable plate 14 at an exact position in a vertical direction. That is, the gear box can be provided in parallel with the acceptable plate 14 in this embodiment, so that the ball screw shaft 12 is connected in an exact vertical state to the output gear of the reduction gear unit 24 in the gear box 30. This is explained in the following with reference to FIGS. 3 and 4.

Figure 3:
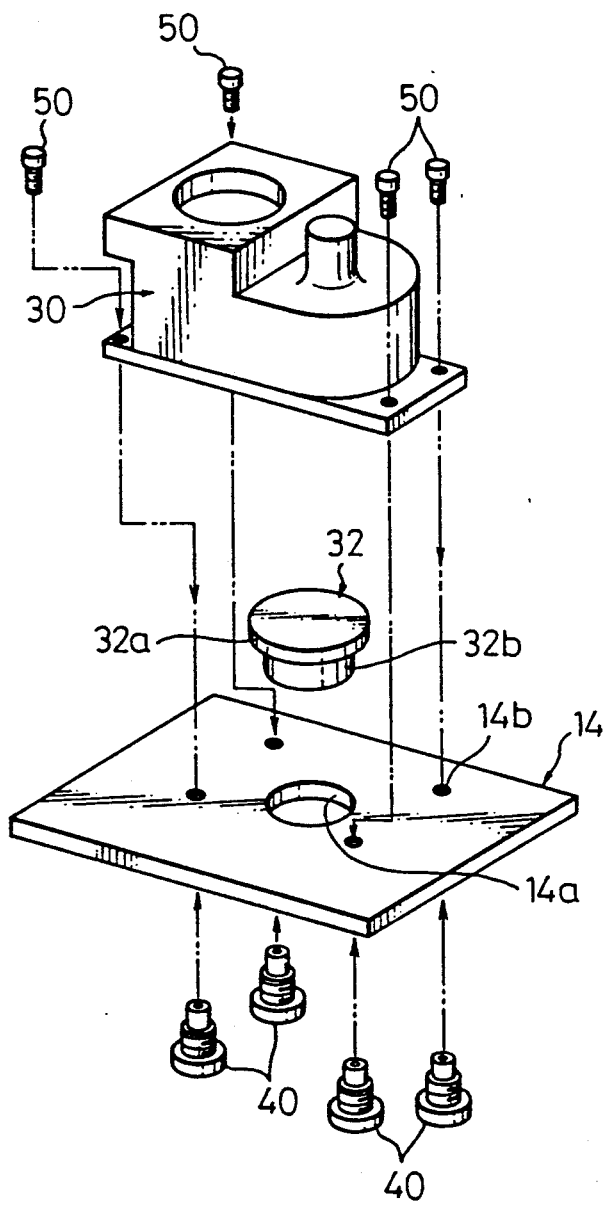
FIG. 3 is a partial perspective view for explaining a process of connecting a gear box to an acceptable plate and positioning the gear box by the positioning element.

FIG. 3 shows a process of connecting the gear box 30 to the acceptable plate 14, from above the plate. In FIG. 3, the housing 32 of the gear box 30 is separated from a body of the gear box 30, however in actual assembling, the housing 32 is inserted to the insert hole 14a of the acceptable plate 14 from above, the housing 32 being attached to the gear box 30. Adequate numbers (in this embodiment, four) of screw holes 14b provided with an interior screw are formed through the acceptable plate 14 at proper positions thereof, other than the above-mentioned insert hole 14a, and the positioning elements 40 are projected upward screw-engaged therewith.

Figure 4:
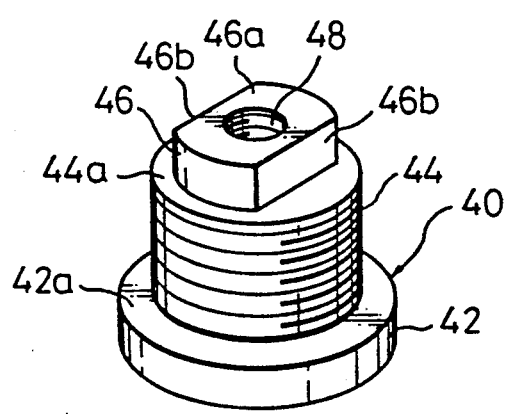
FIG. 4 is an enlarged perspective view of the positioning element.

As shown in FIG. 4, the positioning element 40 is formed by a base portion 42, an exterior screw body 44 portion, and a projecting portion 46 provided with a interior screw hole 48 and further projecting upward from an upper face 44a of the exterior screw body 44, so that the height length L (refer to FIG. 1) between a top face 46a of the projecting portion 46 and the upper surface 42a of the base portion 42 is constant among the positioning elements 40. On the other hand, the upper surface 42a of the base portion 42 is fitted to a bottom of a recess formed at a lower end of the screw hole 14b through the acceptable plate 14 and having a constant depth, and the base portion 42 of the positioning element 40 is fitted in the recess of the acceptable plate 14 to be hidden, as shown in FIG. 1. The assembled structure of the acceptable plate 14, the support frames 16, and the upper plate 18 is distorted because the same is constructed by welding as mentioned above. Accordingly, the lower surface of the acceptable plate 14 and the recess must be machined after the above-mentioned assembled structure is constructed, to form a standard surface for a contact thereto of the upper surface 42a of the positioning element 40. When the plurality of positioning elements 40 are screw-engaged with the acceptable plate 14, all top faces 46a of the positioning elements 40 projecting upward from the acceptable plate 14 are at the same height, so that the gear box 30 is exactly positioned in the height position over the top faces. Namely, the gear box 30 is attached to the top faces 46a of the positioning elements 40, and bolts 50 are inserted into through holes 34 of the gear box 30 to be screw-engaged with the interior screw holes 48 formed in the projecting portions 46 of the positioning elements 40, whereby the assembling of the gear box 30 is completed. A flat face 46b is formed at a side surface of the projecting portion 46 of the positioning element 40, a tool such as a wrench being engaged with this flat face when the positioning element 40 is rotated to be inserted into the acceptable plate 14, so that the positioning element 40 can be tightly screwed to the acceptable plate 40.

Although the above-explained embodiment concerns a structure of a shaft supporter for a vertically extended shaft such as a ball screw shaft, to move a part of an industrial robot vertically, such a structure of a shaft supporter for a prolonged shaft can be also adapted to a rail device of an industrial robot, to move in a horizontal plane.

As apparent from the foregoing description, according to the present invention there can be provided a compact shaft supporter structure having a reduced area projected onto a plane orthogonal to a longitudinal direction of an elongated screw shaft, because a gear box is attached over an acceptable plate. Furthermore, maintenance of a drive motor is easy because the gear box is detachable. Furthermore, the elongated screw shaft can be exactly positioned on the acceptable plate because the gear box and the acceptable plate have insertion connectors to be tightly connected to each other, and the positioning elements are used.

While the invention has been particularly shown and described in reference to preferred embodiments thereof, it will be understood by those skilled in the art that changes in form and details may be made therein without departing from the spirit and scope of the invention.

We claim:

1. A structure of a shaft supporter for supporting both ends of an elongated screw shaft driven by a drive motor in an industrial robot, comprising:
    an acceptable plate used as a base plate;
    a detachable gear box fitted over said acceptable plate, one end of the elongated screw shaft being journaled therein and the drive motor being attached thereto in parallel with the elongated screw shaft, said gear box housing gears for transmitting rotations of the drive motor to the elongated screw shaft;
    an elongated supporting means installed on said acceptable plate and extends therefrom in parallel with the elongated screw shaft; and
    a holder plate for journaling the other end of the elongated screw shaft and attached to an end of said supporting means, wherein supporting means supports said acceptable plate and holder plate at both ends thereof, and wherein said gear box is mounted within a space bounded by said acceptable plate, holder plate, and supporting means.

2. A structure of a shaft supporter in an industrial robot according to claim 1, wherein each of said gear box and said acceptable plate has an insertion connector which is tightly connected to the other.

3. A structure of a shaft supporter in an industrial robot according to claim 1, wherein a standard surface is provided on the lower surface of said acceptable plate, and wherein a plurality of threaded positioning elements each having a surface in contact with said standard surface and each having a top face having the same height dimension from said surface are screw-engaged in threaded holes provided in said acceptable plate from a side of said standard surface, and wherein said gear box is connected to said top faces of said positioning elements so that the gear box is positioned in a longitudinal direction of said elongated screw shaft.

4. A structure of a shaft supporter in an industrial robot according to claim 2, wherein said insertion connector of said gear box includes a circular boss portion provided in a cover member of said gear box, and wherein said insertion connector of said acceptable plate includes an insert hole to which said circular boss portion is smoothly inserted.

5. A structure of a shaft supporter in an industrial robot according to claim 1, wherein said elongated screw shaft includes a ball screw shaft extended vertically.

* * * * *